(12) United States Patent
Verschueren et al.

(10) Patent No.: US 8,693,086 B2
(45) Date of Patent: Apr. 8, 2014

(54) APPEARANCE-MODIFYING DEVICE, METHOD FOR MANUFACTURING SUCH A DEVICE, AND APPLIANCE COVERED BY SUCH A DEVICE

(75) Inventors: Alwin Rogier Martijn Verschueren, Eindhoven (NL); Gerrit Oversluizen, Eindhoven (NL); Sander Jurgen Roosendaal, Brno (NL); Thomas Caspar Kraan, Eindhoven (NL); Dirk Kornelis Gerhardus De Boer, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 500 days.

(21) Appl. No.: 12/996,411

(22) PCT Filed: Jun. 10, 2009

(86) PCT No.: PCT/IB2009/052470
§ 371 (c)(1),
(2), (4) Date: Dec. 6, 2010

(87) PCT Pub. No.: WO2009/153709
PCT Pub. Date: Dec. 23, 2009

(65) Prior Publication Data
US 2011/0097549 A1 Apr. 28, 2011

(30) Foreign Application Priority Data
Jun. 17, 2008 (EP) .................................... 08158397

(51) Int. Cl.
*B32B 3/26* (2006.01)
*B32B 3/24* (2006.01)
*B32B 3/12* (2006.01)
*B32B 38/10* (2006.01)
*G02F 1/167* (2006.01)
*G02B 26/00* (2006.01)

(52) U.S. Cl.
USPC .............. 359/296; 345/107; 428/44; 428/47; 428/48; 428/51; 428/116; 428/117; 428/137; 428/138; 428/212; 428/542.2; 428/913; 428/913.3

(58) Field of Classification Search
None
See application file for complete search history.

(56) References Cited

U.S. PATENT DOCUMENTS 6,656,574 B1 * 12/2003 Nemelka .................... 428/207
6,657,612 B2 * 12/2003 Machida et al. ............ 345/107
6,850,355 B2 * 2/2005 Liang et al. ................. 345/107

(Continued)

FOREIGN PATENT DOCUMENTS

EP 1079584 A2 2/2001
EP 1662305 A2 5/2006

(Continued)

OTHER PUBLICATIONS

Hiemenz et al: "Priniciples of Colloid and Surface Chemistry"; 3rd Edition, Marcel Dekker Inc, 1007, Chapter 12, pp. 534-575.

*Primary Examiner* — Aaron S Austin
*Assistant Examiner* — Jeff Vonch

(57) ABSTRACT

It is disclosed an appearance-modifying device (10), for modifying the visual appearance of a surface covered thereby. The appearance-modifying device (10) comprises two oppositely arranged substrates (11, 12), which are spaced apart by a spacer structure (13). The spacer structure (13) spaces apart the two substrates (11, 12) in such a way that a space between the two substrates (11, 12) is divided into a plurality of cells (15, 16), the shapes of the individual cells (15, 16) being such that an aperiodic cell pattern (14) is formed by the cells (15, 16). Each cell (15, 16) may comprise an optically transparent fluid having a plurality of particles dispersed therein. The particles are moveable in the fluid through application of an electric field. An appliance at least partly covered by the appearance-modifying device (10) is also disclosed. Furthermore, it is disclosed a method for manufacturing the appearance-modifying device.

15 Claims, 8 Drawing Sheets

(56) References Cited

U.S. PATENT DOCUMENTS

| | | | |
|---|---|---|---|
| 6,914,649 B2* | 7/2005 | Liu | 349/109 |
| 7,038,832 B2* | 5/2006 | Kanbe | 359/296 |
| 7,561,324 B2* | 7/2009 | Duthaler et al. | 359/296 |
| 8,154,790 B2* | 4/2012 | Wang et al. | 359/296 |
| 2003/0016590 A1 | 1/2003 | Brewer et al. | |
| 2003/0214479 A1* | 11/2003 | Matsuda et al. | 345/107 |
| 2004/0145561 A1 | 7/2004 | Ikeda | |
| 2004/0145562 A1* | 7/2004 | Horikiri | 345/107 |
| 2004/0227703 A1 | 11/2004 | Lamvik et al. | |
| 2005/0156870 A1* | 7/2005 | Flinner et al. | 345/107 |
| 2006/0256424 A1* | 11/2006 | Hou et al. | 359/296 |
| 2007/0041785 A1* | 2/2007 | Raaijmakers et al. | 404/9 |
| 2007/0120815 A1* | 5/2007 | Kita et al. | 345/107 |
| 2007/0183021 A1* | 8/2007 | Huang | 359/296 |
| 2007/0205976 A1* | 9/2007 | Takatori et al. | 345/100 |
| 2007/0211330 A1* | 9/2007 | Ohshima et al. | 359/296 |
| 2009/0179842 A1* | 7/2009 | Chen et al. | 345/88 |
| 2010/0277446 A1* | 11/2010 | van Veenendaal et al. | 345/205 |
| 2011/0310461 A1* | 12/2011 | Bouchard et al. | 359/296 |

FOREIGN PATENT DOCUMENTS

| | | | | |
|---|---|---|---|---|
| JP | 2004062052 A | * | 2/2004 | G02F 1/1333 |
| JP | 2004333723 A | * | 11/2004 | G09F 9/30 |
| WO | 2006061786 A1 | | 6/2006 | |
| WO | WO 2007010414 A2 | * | 1/2007 | G02C 7/08 |

* cited by examiner

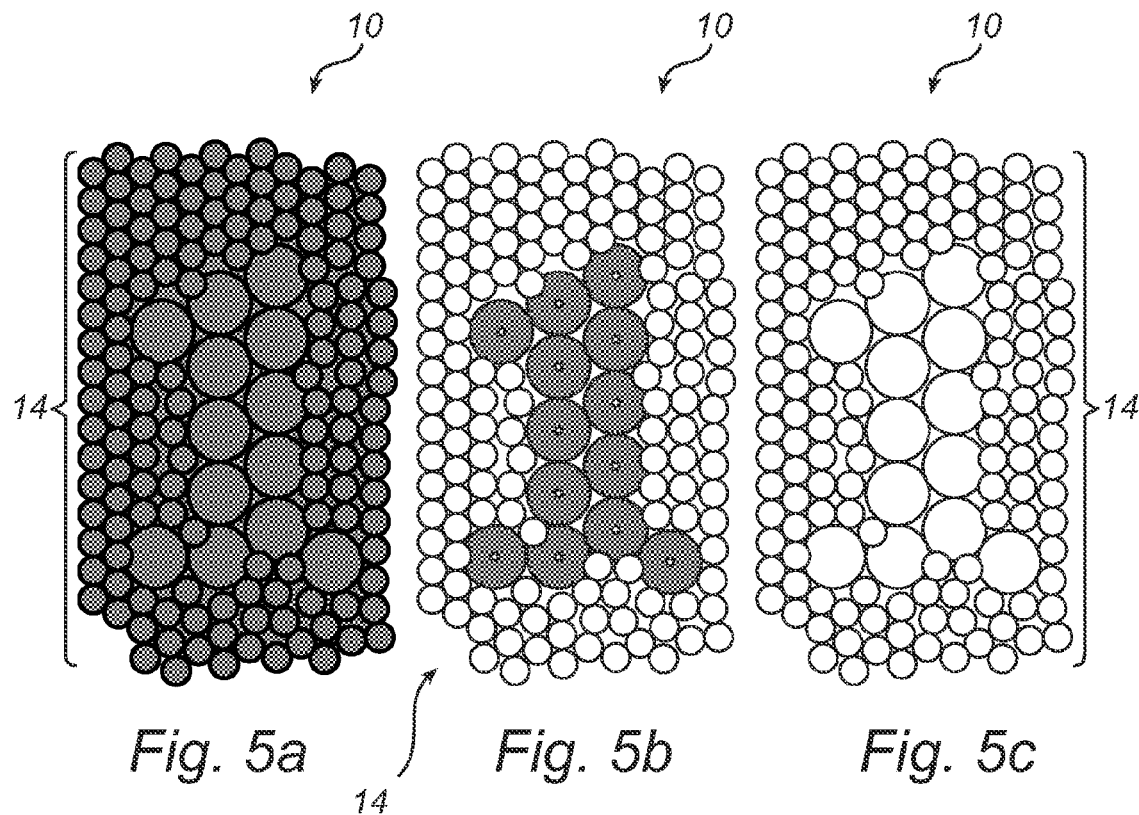
*Fig. 5a*  *Fig. 5b*  *Fig. 5c*
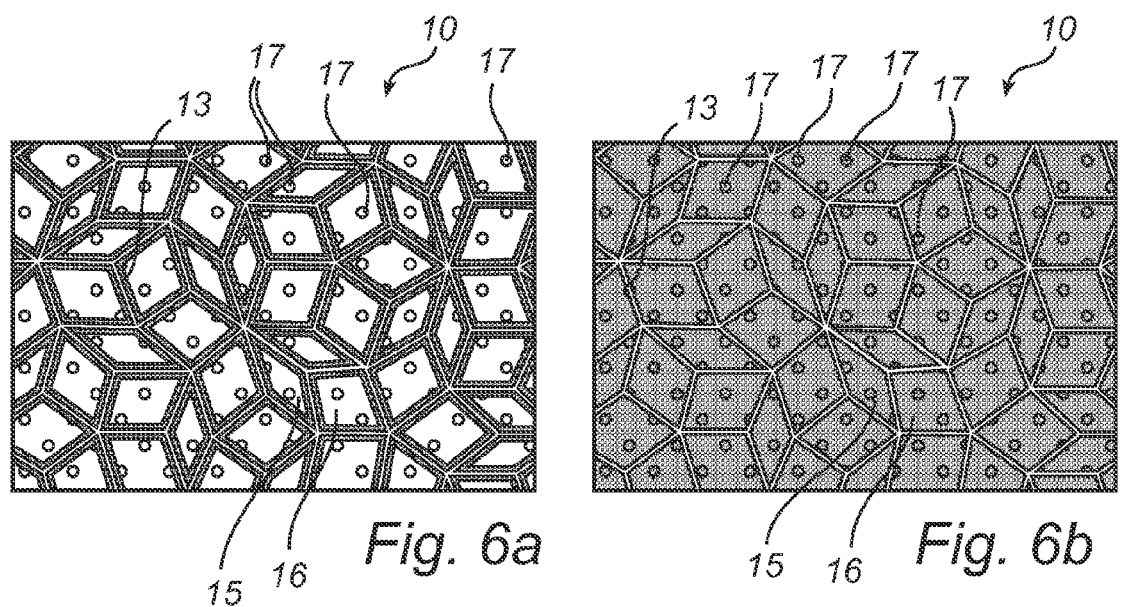
*Fig. 6a*  *Fig. 6b*

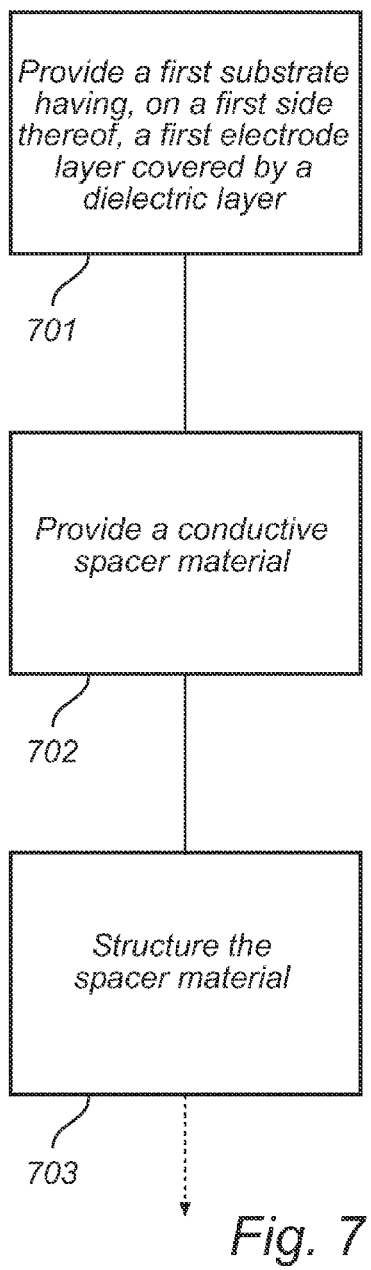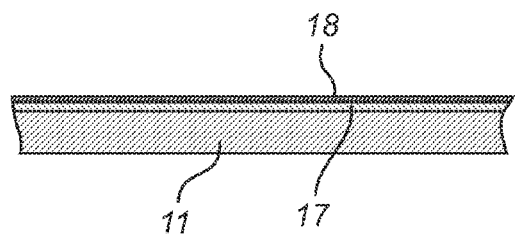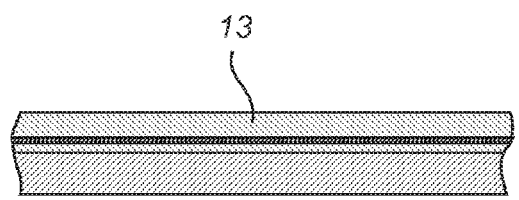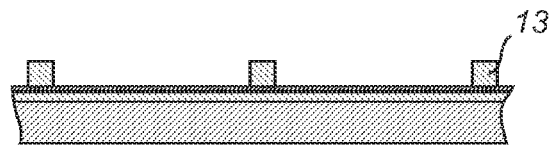

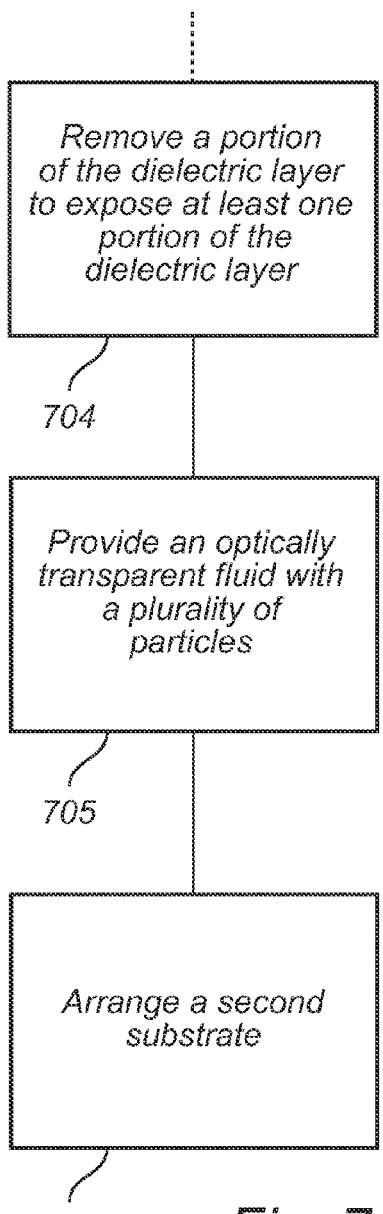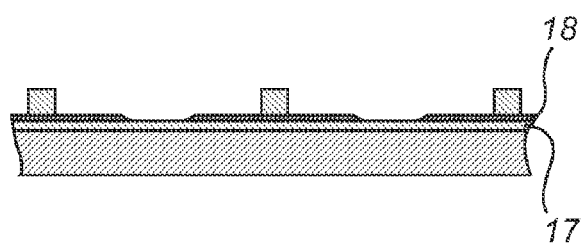
Fig. 8d
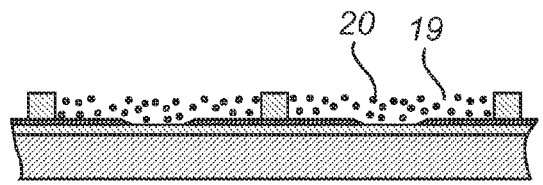
Fig. 8e
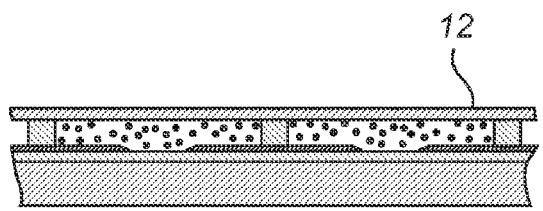
Fig. 7
Fig. 8f

APPEARANCE-MODIFYING DEVICE, METHOD FOR MANUFACTURING SUCH A DEVICE, AND APPLIANCE COVERED BY SUCH A DEVICE

FIELD OF THE INVENTION

The present invention relates to an appearance-modifying device and to an appliance at least partly covered by such an appearance-modifying device. It also concerns a method for manufacturing an appearance-modifying device.

BACKGROUND OF THE INVENTION

For many types of products, customizable appearance of the product may be desirable. For example, it may be attractive to be able to customize the appearance of at least a part of a product depending on its current state, to convey information about the current state of the product to a user in an intuitive and attractive way. It may also be perceived as attractive to the user of a product to be able to alter its appearance to reflect the user's personality or mood etc.

According to one well-known example, such customizable appearance of a product is realized by exchangeable "skins" on consumer electronic products, such as mobile telephones. This type of "skins" is typically provided as plastic shells that can be exchanged by the user of the product. It has also been suggested to use electrically controllable optical properties of an appearance-modifying device covering a surface of a product to alter the appearance of the product.

SUMMARY OF THE INVENTION

It would be advantageous to achieve an improved appearance-modifying device. In particular, it would be desirable to provide an appearance-modifying device capable of providing an appealing aesthetic effect, i.e. an appearance-modifying device that is pleasant to look at. Furthermore, it would be advantageous to achieve an appearance-modifying device capable of being applied on a curved surface. Also, it would be desirable to provide an appearance-modifying device with additional functionality. Yet further, it would also be desirable to provide an appearance-modifying device capable of being switched to a transparent state.

To better address one or more of these concerns, in a first aspect of the invention there is provided an appearance-modifying device, for modifying the visual appearance of a surface covered thereby, comprising first and second oppositely arranged substrates; a spacer structure spacing apart the first and second substrates in such a way that a space between the first and second substrates is divided into a plurality of cells, wherein the shapes of the individual cells of the plurality of cells is such that an aperiodic cell pattern is formed by the plurality of cells; and in each cell, an optically transparent fluid having a plurality of particles dispersed therein, the particles being moveable in the fluid through application of an electric field.

The present invention is based on the realization that, for the application of appearance-modifying devices for customizing the appearance of a certain appliance being covered thereby, it is not necessary that a plurality of cells forms a periodic cell pattern. For display applications a matrix consisting of a periodic cell pattern is advantageous, but in contrast, for the application of appearance-modifying devices it has been realized by the inventors that it is advantageous to utilize an aperiodic pattern of cells. By providing an aperiodic cell pattern, moiré effects can be reduced and the appearance-modifying device can thus be made more natural-looking and pleasant to look at.

According to one embodiment, the plurality of particles are in-plane moving particles that are moveable in the fluid, between a dispersed particle state and a collected particle state, through application of an electric field.

The cells may have varying shapes, sizes and/or orientations.

Additionally, or alternatively, one or several of the cells may have an irregular shape.

The cell pattern may be a quasi-crystal pattern and preferably a Penrose pattern.

By providing cells with varying shapes, irregular shapes, varying sizes and/or varying orientations, it is possible to provide an aperiodic cell pattern which allows for pre-compensating for curved surfaces onto which the appearance-modifying device is to be applied. For example, it is possible to provide an aperiodic cell pattern with a combination of smaller and larger cells in such way that smaller cells are purposely placed at locations where the cells will become enlarged due to stress and deformations when the appearance-modifying device is applied onto a curved surface of an object. This way, when the appearance-modifying device is applied onto the curved object the smaller cells will stretch and enlarge such that, after the appearance-modifying devices has been applied to the curved surface, all cells may have the same or almost the same size. Furthermore, providing a cell pattern with a combination of smaller and larger cells may allow for "watermarking", as smaller cells generally transition from one state (e.g. appearance-modifying state) to another state (e.g. a transparent state) more quickly as compared to larger cells. For instance, by providing a cell pattern with larger cells surrounded by smaller cells allows for the larger cells to become visible during a switching step from one state to another as the larger cells transition or switch slower than the smaller cells when an electrical field is applied.

To reduce moiré effects, the present inventors have found that a cell pattern in the form of a Penrose pattern or Penrose tiling pattern may be particularly suitable. Moiré patterns are the interference (beating) patterns that can arise when two periodic patterns are overlaid. This is relevant in specific applications where the appearance-modifying device is applied onto an object with a periodic structure (for instance a flat screen TV with a periodic pixel structure). If the appearance-modifying device comprises an aperiodic pattern, the moiré artifact can be reduced. A Penrose pattern is ordered (consisting of a repetition of two rhombus shaped elements), but aperiodic. Penrose patterns are a specific embodiment of quasi-crystal patterns, which are structural forms that are both ordered and aperiodic.

According to a preferred embodiment, the appearance-modifying device may further comprise a first electrode layer arranged on a first side of the first substrate, the first electrode layer being covered by a dielectric layer; and a second electrode spaced apart from the first electrode layer at least by the dielectric layer, wherein the dielectric layer, in each cell, has at least one opening formed therein to expose a corresponding portion of the first electrode layer; and wherein the distribution of particles within each of the cells is controllable, by application of a voltage across the electrodes, from a first, dispersed state, to a second state in which the particles are concentrated adjacent to at least one of the at least one opening in the dielectric layer and the second electrode.

The present inventors have found that an appearance-modifying device for modifying the appearance of a surface covered thereby can advantageously be achieved using so-called in-plane switching of an electrophoretic device. It is recognized that electrophoretic display devices based on in-plane control of particles dispersed in a liquid are known per se, for example from US 2003/0214479. However, in US2003/0214479 all cells have regular shapes, e.g. regular hexagon shapes or squares. That is, the cell pattern which is formed by the plurality of cells is a regular or periodic cell pattern. Thus, even if this technology known from available in-plane electrophoretic display devices were to be used to realize an appearance-modifying device, such an appearance-modifying device would not reach the level of reduced moiré effects achievable using the appearance-modifying device according to the present invention.

It should be noted that it is advantageous to have an opening formed in the dielectric layer in each cell to expose the first electrode through the opening. Hereby, the electric field in the cell can be controlled through the position and configuration of the opening as well as through the electric properties (notably the conductivity) of the dielectric layer. By selecting a dielectric layer having a conductivity that is lower than the conductivity of the fluid in the cell, the electric field can be shaped to efficiently direct the particles towards the exposed portion of the first electrode when a suitable voltage is applied across the first and second electrodes.

Which position in the cell of the opening in the dielectric layer that is the most desirable depends on the application of the appearance-modifying device. For some applications, it may be advantageous to have the openings centrally located in each cell. On the other hand, other applications may benefit from off-center locations. Yet further, some applications may benefit from a mix of some cells having centrally located openings and other cells having off-center openings.

Moreover, the dielectric layer may have, in a plurality of cells or in each cell, a plurality of openings formed therein to expose a plurality of portions of the first electrode layer. Even when large deformations or misalignments occur (e.g. during the manufacturing process itself, or later if the appearance-modifying device is to be applied onto a curved object), having a plurality of openings increases the chances of having at least one opening located within each cell after the appearance-modifying device has been applied onto the curved surface. Thus, each cell can have an electrode arrangement allowing for the particles to be concentrated at either of the electrodes within a sufficiently short time period. Hence, by having several openings formed in the dielectric layer, misalignments and deformations can be pre-compensated for beforehand and the appearance-modifying device can be made more robust.

According to a second aspect of the invention, there is provided an appliance comprising a surface, wherein the surface is at least partly covered by the appearance-modifying device according to the first aspect of the invention. The appliance may be any suitable device, for example a television device, a water boiler, a music player or a shaver device.

According to a third aspect of the invention, there is provided a method for manufacturing an appearance-modifying device, for modifying the visual appearance of a surface covered thereby, the method comprising providing a first substrate; providing a spacer structure to form a plurality of cells on the first substrate, the shapes of the individual cells of the plurality of cells being such that an aperiodic cell pattern is formed by the plurality of cells; providing, in each of the cells, an optically transparent fluid having a plurality of particles dispersed therein; and arranging a second substrate to cover the cells.

According to one embodiment, the method may further comprise providing, on the first side of the first substrate, a first electrode layer covered by a dielectric layer; providing the spacer structure forming the plurality of cells on the first side of the first substrate in such a way that an area occupied by each cell includes a portion of the first electrode layer; providing a second electrode spaced apart from the first electrode layer at least by the dielectric layer, and removing, in an area corresponding to each cell, at least one portion of the dielectric layer to form a recess therein.

The removing may comprise: removing, in a center portion of the area corresponding to each cell, the portion of the dielectric layer. Additionally, or alternatively, the removing may comprise: removing, in the area corresponding to each cell, a plurality of portions of the dielectric layer.

The present inventors have realized that an appearance-modifying device can advantageously be manufactured by covering the first electrode layer with a dielectric layer, and then forming at least one recess in the dielectric layer, which minimizes the need for patterning and alignment of the first electrode.

The recess(es) should be provided in such a way that the first electrode layer is exposed, or at least only covered by a very thin remaining layer of dielectric, the condition for the thickness of the remaining layer in relation to the cell being given by the following expression:

$$\frac{thickness_{dielectricopening}}{conductivity_{dielectric}} << \frac{radius_{cell}}{conductivity_{fluid}} << \frac{thickness_{dielectric}}{conductivity_{dielectric}}$$

Providing a recess in the dielectric layer in such a way that the above condition is satisfied results in an electric field configuration in the cell, when a voltage is applied between the first and second electrodes, which efficiently concentrates the particles dispersed in the fluid to a first particle concentration site constituted by the recess (typically exposing a portion of the first electrode layer) and/or to a second particle concentration site constituted determined by the configuration of the second electrode. In this way no further control electrodes are needed to concentrate the particles to a small part of each cell, whereby a ratio between a controllable area in each cell and the total area of the cell can be maximized. In addition, the manufacturing is simplified since fewer layers, and accordingly less alignment is needed in comparison to prior art.

By providing a recess in the dielectric layer, the electric field in the cell can be controlled through the position and configuration of the recess as well as through the electric properties (notably the conductivity) of the dielectric layer. By selecting a dielectric layer having a conductivity that is lower than the conductivity of the fluid in the cell, the electric field can be shaped to efficiently direct the particles towards the first particle concentration site constituted by the recess (typically exposing a portion of the first electrode) when a suitable voltage is applied between the first and second electrodes.

According to a fourth aspect of the invention, there is provided a computer program product comprising software instructions that, when executed in a computer, performs the method according to the third aspect.

The second, third and fourth aspects may generally have the same features and advantages as the first aspect.

Other aspects, features and advantages of the disclosed embodiments of the present invention will appear from the following detailed disclosure, from the appended claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

In the present application, "fluid" is understood to be a substance, which alters its shape in response to any force and tends to flow or to conform to the outline of the chamber in which it may be contained. The term "fluid" thus includes gases, liquids, vapors and mixtures of solids and liquids, when these mixtures are capable of flow.

The term "particles" is not limited to solid particles, but also includes liquid droplets and fluid-filled capsules.

Any one or both of the first and second substrates may be an optically transparent member, typically sheet-shaped, on which the spacer structure can be formed. Suitable substrate materials include, for example, glass, polycarbonate, polyimide etc. This may allow for enabling transparent cell properties in the states when the particles are concentrated adjacent to at least one of the electrodes. A transparent state may be beneficial if for example the surface covered by the appearance-modifying device conveys information.

Any one or both of the first and second electrodes may be formed by a transparent material, such as ITO (Indium-Tin-Oxide), IZO (Indium-Zinc-Oxide), or similar well-known materials.

By an "optically transparent" medium is, in the present context, meant a medium which permits passage of at least a fraction of the light (electromagnetic radiation in the visible spectrum) impinging on it.

The optical properties of the particles should be interpreted as the effect of interaction between the particles and the light impinging on the particles. For example, the particles may partially or essentially completely reflect light, absorb light or scatter light. Each of these effects may be, and typically is, wavelength dependent, whereby colored effects can be achieved.

It should further be noted that the particles dispersed in the fluid may or may not be charged. For uncharged particles, the particles are caused to move in response to the application of an electric field through dielectrophoresis, which is described in detail in "Dielectrophoresis; the behavior of neutral matter in non-uniform electric fields", by H. A. Pohl, University Press, Cambridge, 1978.

In the case of charged particles, the majority of the particles may advantageously have the same sign charge so as to prevent clustering of oppositely charged particles. (Electrical neutrality of the fluid is ensured by the presence of ions of opposite charge.)

However, it may also be advantageous to provide the particles as a mix of positively and negatively charged particles. When controlling the appearance-modifying device to its transparent state, the particles may then be collected at both electrodes, depending on polarity. This may lead to a more transparent state.

Furthermore, color control of the appearance-modifying device can be achieved by providing a first set of positively charged particles having a first color and a second set of negatively charged particles having a second color.

The particles may, furthermore, be essentially uniformly distributed in the absence of an electric field. When a field is applied, the particles may be re-distributed. Either the particles move until the field is removed or a state is entered in which there is an equilibrium between the forces exerted on the particles through their own charges (in the case of electrophoresis) or dipoles (in the case of dielectrophoresis) and the applied electric field. For a more detailed description of electrophoresis, the following document is referred to:

"Principles of Colloid and Surface Chemistry", by P. C. Hiemenz and R. Rajagopalan, $3^{rd}$ edition, Marcel Dekker Inc., New York, 1997, pp. 534-574.

BRIEF DESCRIPTION OF THE DRAWINGS

Embodiments of the present invention will now be described in more detail, reference being made to the enclosed drawings, in which:

FIGS. 5a-c illustrate examples of possible cell patterns for an appearance-modifying device according to an embodiment of the present invention;

FIGS. 6a-c are different views of an exemplary appearance-modifying device according to an embodiment of the present invention;

FIG. 7 is a flow chart schematically illustrating a first exemplary method for manufacturing an appearance-modifying device according to an embodiment of the present invention;

FIGS. 8a-f schematically illustrate the appearance-modifying device manufactured according to the method of FIG. 7 in states following the corresponding method steps.

DETAILED DESCRIPTION OF EMBODIMENTS

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Furthermore, like numbers refer to like elements throughout.

There are a large number of applications for various embodiments of the appearance-modifying device according to the present invention, some of which are schematically illustrated in FIG. 1a-g.

Figure 1A:
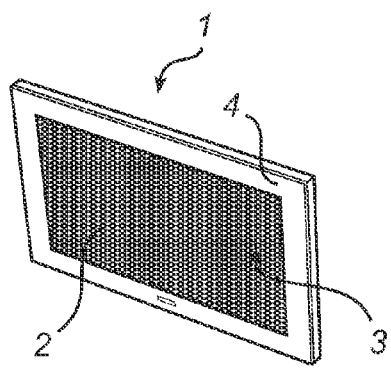
FIGS. 1a-g schematically illustrate various applications for embodiments of the appearance-modifying device according to the present invention.
Figure 1B:
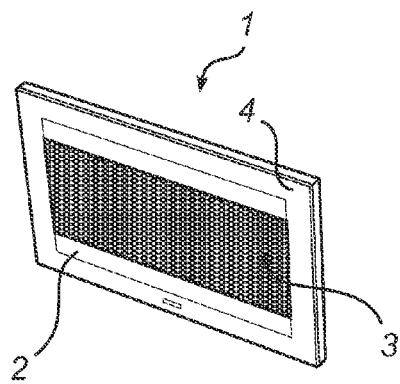
Figure 1C:
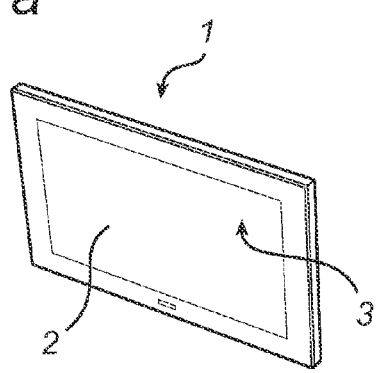

In FIGS. 1a-c, a flat screen television device 1 is provided with an appearance-modifying device 2 covering at least the display 3 of the television device 1. FIG. 1a shows the television device 1 in normal, full-screen, operation in which the entire display is used for displaying image content, with the appearance-modifying device 2 in a substantially transparent state. Accordingly, the entire display 3 of the television device 1 is visible for a viewer. FIG. 1b shows the television device 1 in wide-screen operation with the appearance-modifying device 2 in a partially transparent state such that a portion of the display 3 has had its appearance modified by the appearance-modifying device 2. In the present example, the appearance-modifying device 2 has modified the portion of the display 3 that is not used to display image content to have essentially the same appearance as the frame 4 surrounding the display 3. Finally, FIG. 1c shows the television device 1 when turned off, with the appearance-modifying device 2 in a state in which it modifies the entire display 3 to have essentially the same appearance as the frame 4 surrounding the display 3.

Figure 1D:
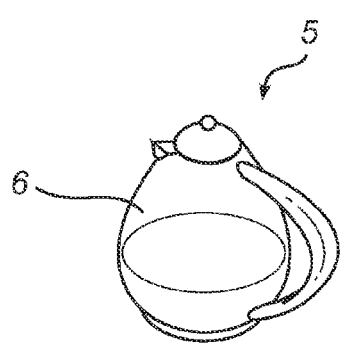
Figure 1E:
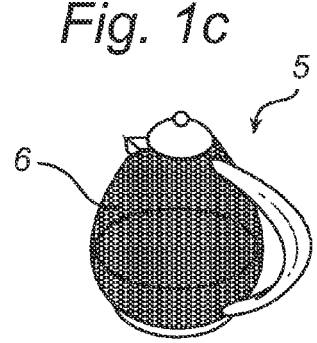

A further application in the form of a water boiler 5 is schematically illustrated in FIGS. 1d-e. By covering the water boiler 5 by an appearance-modifying device 6, the water boiler can be made to visually illustrate its state to a user. For example, the appearance-modifying device 6 can be controlled between a first color, for instance blue, to indicate that the water in the water boiler is cold and a second color, for instance red, to indicate that the water (and thus the water boiler 6) is hot.

Figure 1F:
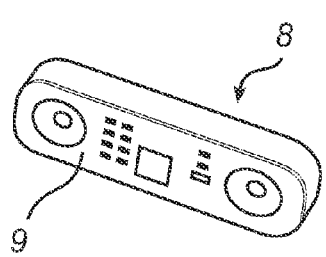
Figure 1G:
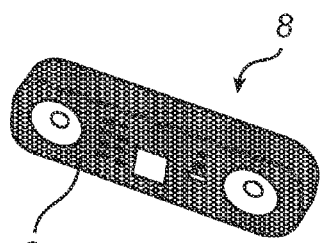

In another application, in the form of the music player 8 in FIGS. 1f-g, the music player 8 can be covered by an appearance-modifying device 9 to enable a user to control the appearance, such as the color, of the music-player according to her/his mood or personal preference.

Having now indicated some examples of the numerous applications for an appearance-modifying device, exemplary embodiments of the appearance-modifying device according to the present invention will be described in the following. However, before exemplary embodiments of the appearance-modifying device according to the present invention are described, an appearance-modifying device 100 as illustrated in FIG. 2 will be briefly discussed in order to help the reader understand the features, advantages and principles of various embodiments of the present invention, which will be described in connection to FIGS. 3-9.

Figure 2:
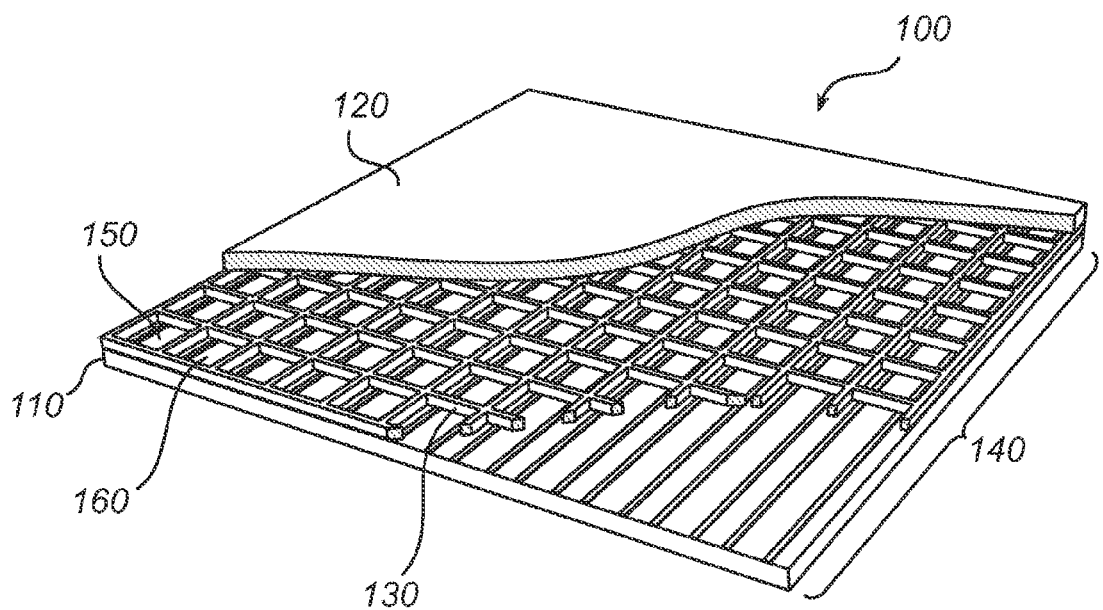
FIG. 2 is a perspective view of an appearance-modifying device.

FIG. 2 schematically illustrates an appearance-modifying device 100 comprising first 110 and second 120 oppositely arranged substrates. The substrates 110, 120 are spaced apart by a spacer structure 130 in such a way that a space between the first 110 and second 120 substrates is divided into a plurality of cells 150, 160 (only two cells are indicated by reference numerals in FIG. 2). The plurality of cells 150,160 together form a cell pattern 140. Typically, the peripheral shapes of the individual cells 150, 160 dictate what type of cell patterns are possible. As is illustrated in FIG. 2, when rectangular cells 150, 160 are used the cell pattern is typically a rectangular grid. The grid-like cell pattern 140 used to cover the area defined by the first 110 and second 120 oppositely arranged substrates is an example of a periodic cell pattern.

As used herein, periodic cell patterns are patterns that have a translational symmetry. Translational symmetry is an invariant isometry in a given direction through a given distance. Isometry is a mapping of the Euclidean plane onto itself which preserves all distances. Symmetry is defined as an isometry that maps any given set onto itself. Thus, if a target area is covered using a periodic cell pattern, by starting at a particular point within the target area and taking a finite area of radius "R1" around the point, by moving another radius "R2" away, the exact same texture can be found that is contained in the area around the point. Using grid-like patterns and other periodic patterns causes certain "periods" to be formed. These periods are like repeating puzzle pieces that form repeating sub-patterns that are easily detected over the target area.

FIGS. 3a-3e schematically illustrates an exemplary embodiment of an appearance-modifying device 10 according to the present invention.

Figure 3A:
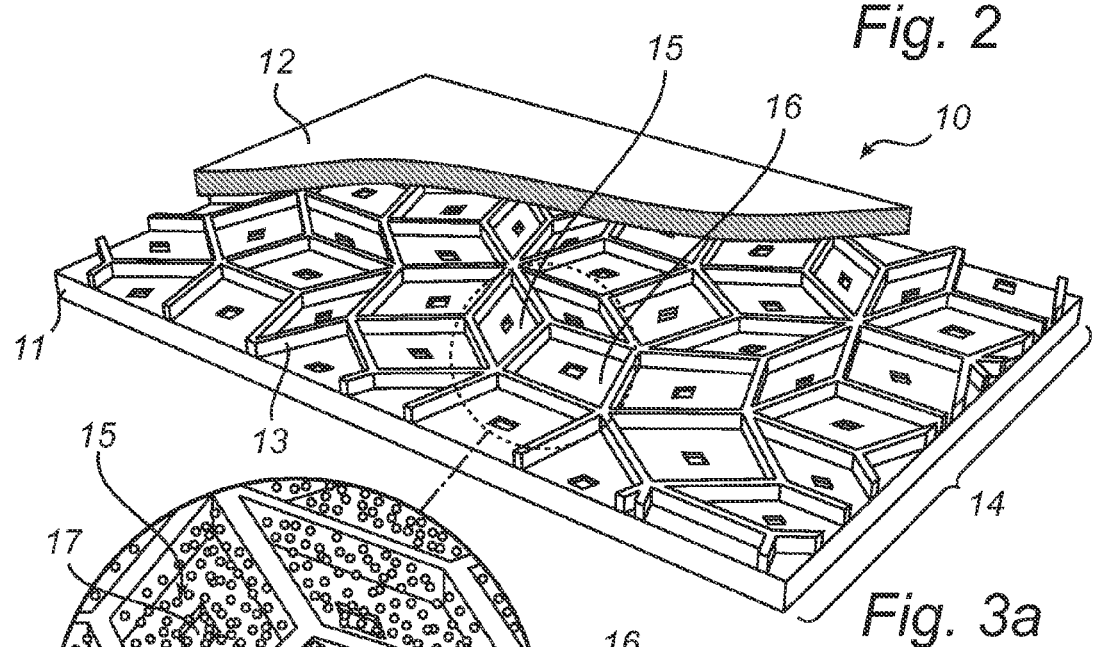
FIGS. 3a-e are different views of an exemplary appearance-modifying device according to an embodiment of the present invention.

FIG. 3a schematically illustrates an appearance-modifying device 10 comprising first 11 and second 12 oppositely arranged substrates. Any or both of the first and second substrates 11, 12 may optionally be an optically transparent member. Suitable substrate materials include, for example, glass, polycarbonate, polyimide etc. The substrates 11, 12 are spaced apart by a spacer structure 13 in such a way that a space between the first 11 and second 12 substrates is divided into a plurality of cells 15, 16 (only two cells are indicated by reference numerals in FIG. 3a). In contrast to the appearance-modifying device 100 that is shown in FIG. 2, the peripheral shapes of the individual cells 15, 16 of the plurality of cells in appearance-modifying device 10 of FIG. 3a is such that an aperiodic cell pattern 14 is formed by the plurality of cells. Typically, the aperiodic cell pattern 14 lacks any translational symmetry. The cells 15, 16 may have varying shapes. One or several of the cells 15, 16 may have an irregular cell shape. For example, one or several of the cells 15, 16 may have a shape other than a polygon shape with all equally long and straight sides. Yet further, the cells may have varying sizes. Additionally, or alternatively, the cells may have varying orientations. Yet further, the cells 15, 16 may have shapes such that a so-called Penrose pattern, a.k.a. Penrose tile pattern, is formed by the plurality of cells.

The present inventors have realized that, for the application of appearance-modifying devices 10 for customizing the appearance of a certain appliance being covered thereby, it is not necessary that the plurality of cells forms a periodic cell pattern as that shown in FIG. 2. On the contrary, for the application of appearance-modifying devices 10 it is indeed possible, and it may even be advantageous, to utilize an aperiodic cell pattern 14 of cells. For example, by providing an aperiodic cell pattern moiré effects can be reduced and the appearance-modifying device can thereby be made more natural-looking and pleasant to look at for a viewer.

Figure 3E:
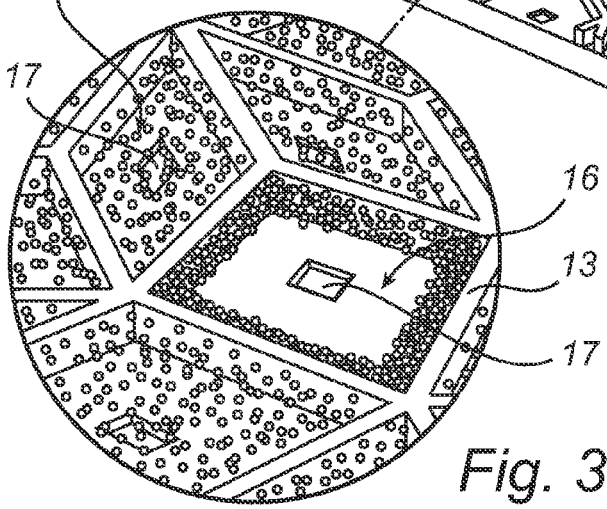
Figure 3B:
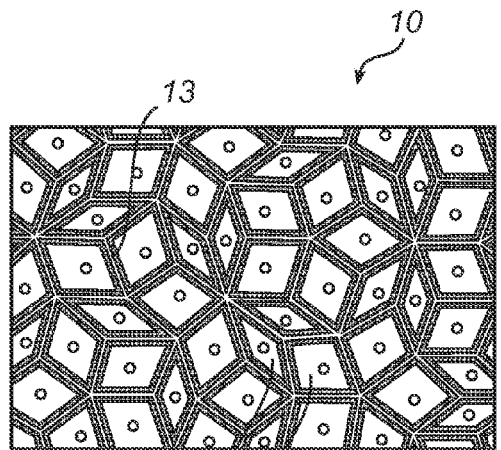
Figure 3C:
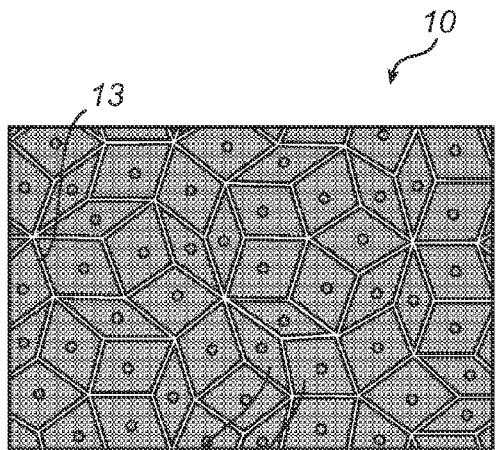

Referring now to FIGS. 3b-c, FIG. 3b illustrates a schematic plane view of the appearance-modifying device 10 in a first, e.g. substantially transparent, state, whereas FIG. 3c illustrates a schematic plane view of the same appearance-modifying device 10 in a second, e.g. appearance-modifying, state.

Figure 3D:
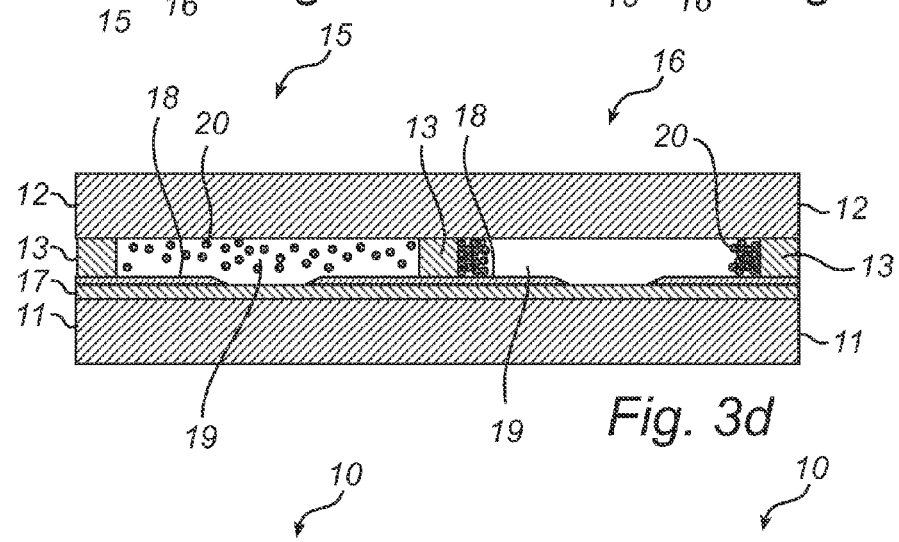

In FIG. 3d, which is a schematic cross-section view of the cells 15 and 16 shown in FIGS. 3a-c, it can be seen that a first electrode is here provided in the form of an electrode layer 17 covering the first substrate 11. The first electrode 17 is in turn partly covered by a dielectric layer 18, separating the spacer structure 13 from the first electrode 17. In this embodiment of the appearance-modifying device 10, the spacer structure 13 is conductive and constitutes a second electrode. Accordingly, all of the cells 15, 16 of the appearance-modifying device 30 are controllable by the same two electrodes 13 and 17. Any one or both of the first 17 and second 13 electrodes may be formed by a transparent material, such as ITO (Indium-Tin-Oxide), IZO (Indium-Zinc-Oxide), or similar well-known materials. Moreover, each cell comprises a plurality of particles 20 distributed in an optically transparent fluid 19. This can also be seen from FIG. 3e.

Referring to FIG. 3e, the cell 15 to the left in is in a state in which the particles 20 are dispersed in the fluid 19 so that the appearance of the surface covered by the cell 15 is determined by the optical properties of the particles 20. Hence, the cell 15 is in its first state, e.g. an appearance-modifying state (see also FIG. 3c). Typically, the particles 20 are in the dispersed state shown in the left cell 15 in FIG. 3e when there is no voltage difference between the first electrode 17 and the second electrode (spacer structure 13). Turning now to the cell 16 to the right in FIG. 3e, the particles 20 have been concentrated at the second electrode 13 through application of a suitable voltage between the first 17 and second 13 electrodes. Through the concentration of particles 20 in the cell 16 to the right, the cell 16 is switched to its second state, e.g. a substantially transparent state (see FIG. 3b), and, hence, does not modify the appearance of a surface covered thereby (other than absorbing and/or reflecting some of the light leading to a decreased brightness of the underlying surface).

There are a large number of possible aperiodic cell patterns 14 for various embodiments of the appearance-modifying device 10 according to the present invention, some of which are schematically illustrated in FIGS. 4a-b and FIGS. 5a-c, respectively.

Figures 4A, 4B:
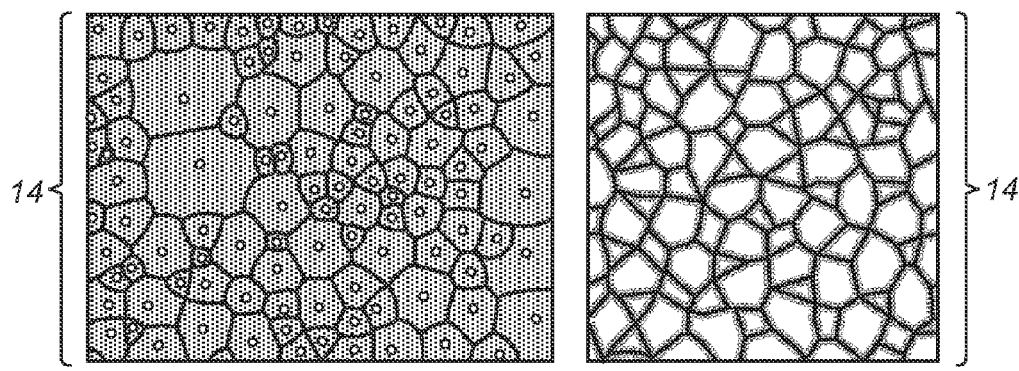
FIGS. 4a-b illustrate examples of possible cell patterns for an appearance-modifying device according to an embodiment of the present invention.

Referring to FIGS. 4a-b, these Figures illustrate two examples of an aperiodic cell pattern 14, where the various cells have varying shapes, sizes and/or orientations. In FIG. 4a, the appearance-modifying device 10 is in a appearance-modifying state, whereas FIG. 4b illustrates a schematic plane view of a appearance-modifying device 10 in a substantially transparent state.

A further cell pattern 14 is schematically illustrated in FIGS. 5a-c. FIG. 5a is a schematic plane view of the appearance-modifying device 10 in an appearance-modifying state, and FIG. 5c is a schematic plane view of the same appearance-modifying device 10 in a substantially transparent state. FIG. 5b is a schematic plane view of the same appearance-modifying device 10 in an intermediate state a.k.a. switching state. In FIGS. 5a-5c, the cells have different sizes and are further arranged in such way that a symbol (in this case the numeral "1") is formed by the larger cells. Since smaller cells generally switch or transition more quickly from one state to the other as compared to larger cells, this can be used in a novel way as depicted in FIGS. 5a-5c. During the switching from the appearance-modifying state shown in FIG. 5a to the transparent state shown in FIG. 5c, there is an intermediate state illustrated in FIG. 5b in which the symbol made up by the relatively larger cells becomes visible. Hence, by providing a cell pattern with a combination of smaller and larger cells in this way and owing to the different switching speeds of larger and smaller cells, symbols, icons, texts or other messages can be flashed to the viewer during an intermediate switching state.

Figure 6C:
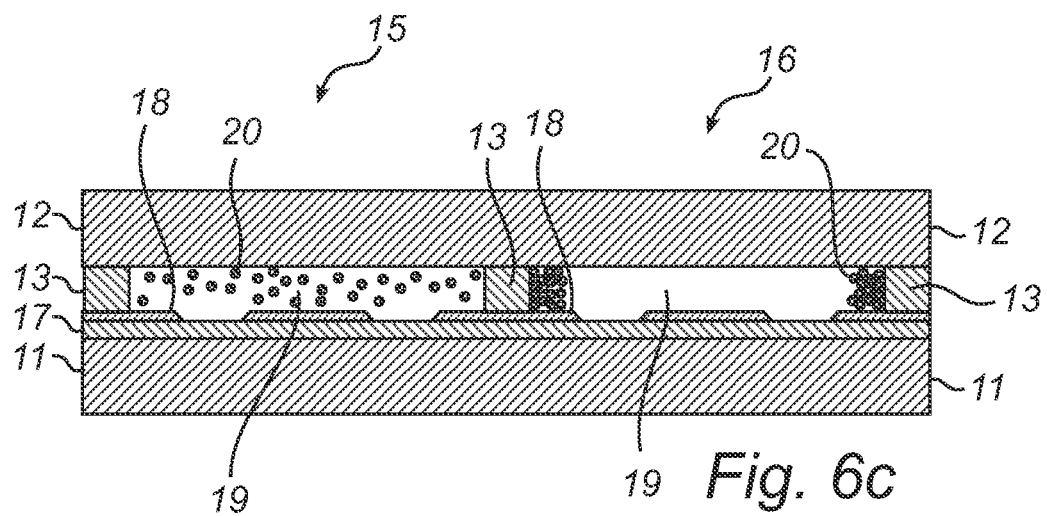

Turning now to FIGS. 6a-6b, which are schematic plane views of further possible aperiodic cell patterns 14 for various embodiments of the appearance-modifying device 10 according to the present invention. In FIGS. 6a-6b, it can be seen that the dielectric layer has, in each cell or at least in a majority of cells, a plurality openings formed therein to expose not only one but a plurality of portions of the first electrode layer 17. This is also shown in FIG. 6c, which is which is a schematic cross-section view of two exemplary cells 15 and 16 shown in FIGS. 6a-b. It can be seen that a first electrode is here provided in the form of an electrode layer 17 covering the first substrate 11. The first electrode 17 is in turn partly covered by a dielectric layer 18, separating the spacer structure 13 from the first electrode 17. Again, the spacer structure 13 may be conductive and constitute a second electrode. Furthermore, each cell comprises a plurality of particles 20 distributed in an optically transparent fluid 19. As can be seen from FIGS. 6a-6c, each cell 15, 16 has a plurality of openings formed therein to expose a plurality of portions of the first electrode layer 17. In the cell pattern denoted 14, the plurality of openings 17 may have a density that is higher than the density of the cells. As a result, even when large deformations or misalignments occur (e.g. if the appearance-modifying device is to be applied onto a curved object), having a plurality of openings increases the chances of having at least one opening located within each cell after the appearance-modifying device has been applied onto the curved surface. Thus, each cell can have an electrode 17 arrangement allowing for the particles 20 to be concentrated at either of the electrodes 17,13 within a sufficiently short time period. Hence, by having several openings formed in the dielectric layer, misalignments and deformations can be pre-compensated for beforehand and the appearance-modifying device can be made more robust.

A method for manufacturing an appearance-modifying device according to an exemplary embodiment of the invention will now be described with reference to FIG. 7 which is a flow chart schematically illustrating such a method and FIGS. 8a-f which schematically illustrate the appearance-modifying device in states following the corresponding method steps of FIG. 7. In FIG. 7 the same reference numerals as for FIGS. 3a-e are used.

In a first step 701, a first substrate 11 having, on a first side thereof, a first electrode layer 17 covered by a dielectric layer 18, is provided.

In a subsequent step 702, a conductive spacer material 13 is provided on the dielectric layer 18.

In the next step 703, the spacer material 13 is structured, for example through embossing, to form a plurality of cells on the first side of the first substrate 11. The shapes of the individual cells of the plurality of cells are chosen such that an aperiodic cell pattern is formed by the plurality of cells. At the same time, the second electrode is provided in form of the spacer structure 13.

The spacer material may, e.g., be provided using any conventional manufacturing technology, such as through any reel-to-reel coating techniques that are able to form a thin layer. Examples of such techniques include slot-die, where coating liquid is forced out from a reservoir through a slot by gravity or under pressure, and transferred to a moving substrate, and gravure coating, where an engraved roller runs in a coating bath that fills the imprinted dots or lines of the roller with the coating material, whereafter the excess coating on the roller is removed by the doctor blade and the coating is deposited onto the substrate as it passes through the engraved roller and a pressure roller. The structuring of the spacer material may, for example, be performed through of embossing, which is typically accomplished with a combination of heat and pressure on the material. Other structuring techniques may be photolithography, micro-molding or laser ablation. Alternatively, the spacer structure may be provided directly through various printing techniques, such as gravure, flexo, offset, screen, or inkjet printing.

Thereafter, in step 704, at least one portion of the dielectric layer 18 in each cell is removed to expose corresponding portion(s) of the first electrode 17. The removal of the dielectric layer 18 may be performed using any suitable method known in the art. A preferred method for removing the portion of the dielectric layer will, however, be described below in connection with FIG. 9.

Advantageously, the step 704 involves removing two or more portions of the dielectric layer 18 in each cell to expose two or more corresponding portion(s) of the first electrode 17. By providing several openings in the dielectric layer 18 covering the first electrode layer 17, several particle concentration locations are provided. Hereby, alignment tolerance may be improved. This is an important feature of an appearance-modifying device 10, which should advantageously be capable of conforming to the shape of the device or object to be covered thereby.

In a following step 705, each cell 15, 16 is filled with a fluid-particle suspension including a plurality of particles 20 suspended in an optically transparent fluid 19.

As a final step 706, a second substrate 12 is arranged on the opposite side of the spacer structure 13 from the first substrate 11, to close the cell.

In FIG. 9 the steps of a preferred method for removing a portion of the dielectric layer 18 in each cell 15-16 is illustrated.

Figure 9A:
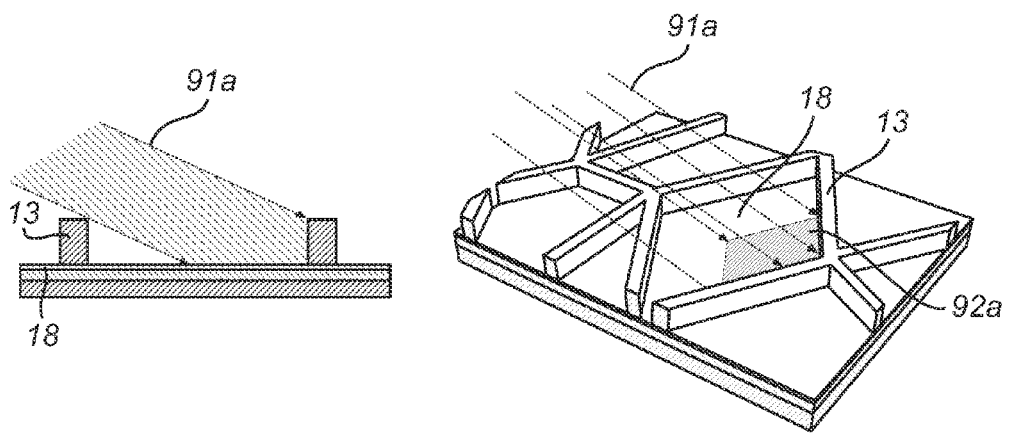
FIGS. 9a-c schematically illustrate the step of removing a portion of the dielectric layer of the method illustrated in FIG. 7.

As shown in FIG. 9a, a first material removing beam 91a is directed in a first direction, indicated by the arrows in FIG. 9a, towards the cells 15, 16. The first material removing beam 91a hits a first portion 92a of the dielectric layer 18 in the cell, since the spacer structure 13 act as a mask to prevent the first material removing beam 91a from hitting a remaining portion of the dielectric layer.

Figure 9B:
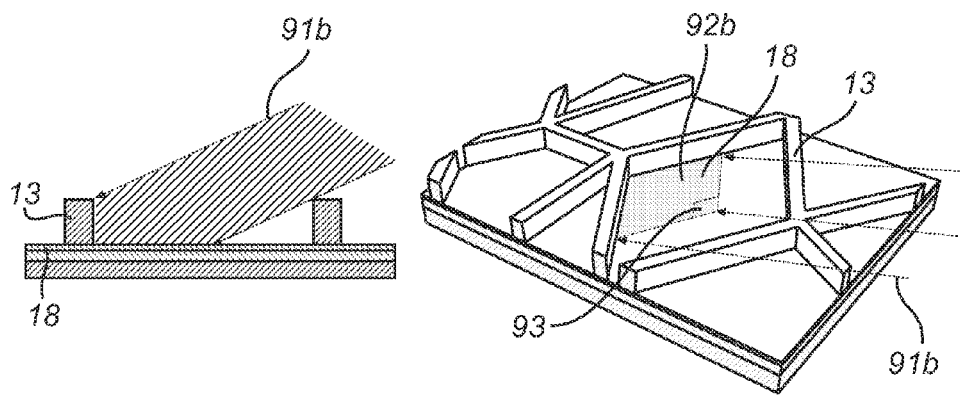

Subsequently, as shown in FIG. 9b, a second material removing beam 91b is directed in a second direction, indicated by the arrows in FIG. 9b, towards the cells 15, 16. The second material removing beam 91b hits a second portion 92b of the dielectric layer 18 in the cell, since the spacer structure 13 acts as a mask to prevent the second material removing beam 91b from hitting a remaining portion of the dielectric layer. In FIGS. 9a-b the two beams 91a-b are shown to hit the cells 15, 16 sequentially, but they may alternatively hit the cells 15, 16 simultaneously.

In this manner the portion 93 of the dielectric layer where both the first material removing beam 91a and the second material removing beam 91b hit the dielectric layer 18, in other words where the portions 92a and 92b coincide, the dielectric layer 18 is removed more than in the remaining area of the cell, creating an opening in the dielectric layer 18 to expose the first electrode 17.

Figure 9C:
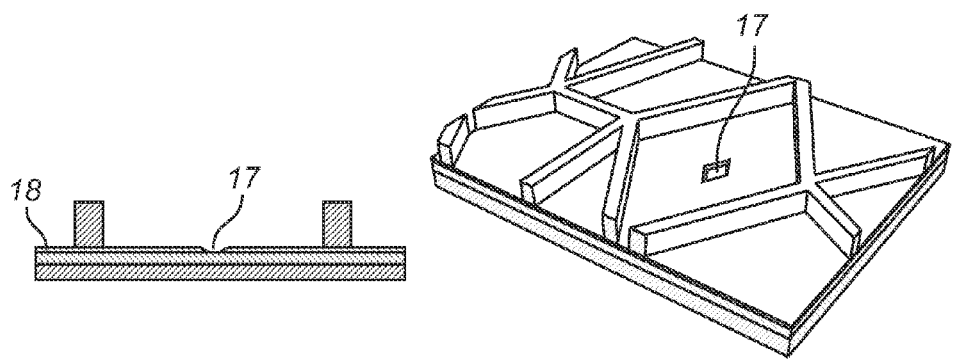

The result is illustrated in FIG. 9c where at least one opening in the dielectric layer 18 is created, exposing the first electrode 17.

Advantageously, the above-described method for removing a portion of the dielectric layer 18 may be performed using dry-etching, in which case the material removing beams 91a-b are ion beams. Alternatively, the portion of the dielectric layer 18 may be removed using laser ablation or similar, in which case the material removing beams 91a-b are laser beams.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measured cannot be used to advantage. Furthermore, any reference signs in the claims should not be construed as limiting the scope.

The invention claimed is:

1. An appearance-modifying device covering a surface and modifying a visual appearance of said surface, said a appearance modifying device comprising:
   first and second oppositely arranged substrates;
   a spacer structure spacing apart the first and second substrates, wherein a space between the first and second substrates is divided into a plurality of cells arranged in an aperiodic cell pattern of a plurality of cells of a first size and a plurality of cells of a second size, said second size being smaller than said first size, wherein said plurality of cells of said first size are used to form symbols, said plurality of cells of a second size are not used to form symbols, and a plurality adjacent ones of said plurality of cells of said first size are surrounded by a plurality of said plurality of cells of said second size; and
   an optically transparent fluid having a plurality of particles dispersed in each cell, the particles being moveable in the fluid through application of an electric field.

2. The appearance-modifying device according to claim 1, wherein the plurality of particles are in-plane moving particles that are moveable in the fluid in one of: a dispersed particle state and a collected particle state.

3. The appearance-modifying device of according to claim 1, wherein the cells of said first size and the cells of said second size are further at least one of: a different shape and a different orientation.

4. The appearance-modifying device of according to claim 1, wherein at least one of the plurality of cells has an irregular shape.

5. The appearance-modifying device according to claim 1, wherein the aperiodic cell pattern is a quasi-crystal pattern.

6. The appearance-modifying device according to claim 1, further comprising:
   a first electrode layer arranged on a first side of the first substrate, the first electrode layer-being covered by a dielectric layer; and
   a second electrode spaced apart from the first electrode layer at least by the dielectric layer, wherein the dielectric layer, in each cell, has at least one recess formed therein; and wherein the distribution of particles within each of the cells is controllable, by application of a voltage across the first and second electrodes, from a first, dispersed state, to a second state in which the particles are concentrated adjacent to at least one of the at least one recess in the dielectric layer and the second electrode.

7. The appearance-modifying device according to claim 6, wherein the at least one recess is substantially centrally located in a corresponding cell.

8. The appearance-modifying device according to claim 6, wherein the dielectric layer-in selected ones of the cells have a plurality of recesses formed therein.

9. The appearance-modifying device according to claim 6, wherein the dielectric layer, in each cell, has a plurality of openings formed therein to expose a plurality of portions of the first electrode layer.

10. The appearance-modifying device according to claim 6, wherein the spacer structure is conductive and forms the second electrode.

11. An appliance comprising a surface, wherein the surface is at least partly covered by the appearance-modifying device according to claim 1.

12. A method for manufacturing an appearance-modifying device, modifying a visual appearance of a surface covered thereby, the method comprising:
   providing a first substrate;
   providing a spacer structure to form a plurality of cells on the first substrate in an aperiodic cell pattern having a plurality of cells of a first size and a plurality of cells of a second size, said second size being smaller than said first size, wherein said plurality of cells of said first size are used to form symbols, said plurality of cells of said second size are not used to form symbols, and a plurality adjacent ones of said plurality of cells of said first size are surrounded by a plurality of said plurality of cells of a second size;

providing, in each of the cells, an optically transparent fluid having a plurality of particles dispersed therein, the particles being moveable in the fluid through application of electric field; and arranging a second substrate to cover the cells.

13. The method according to claim 12, further comprising:

providing, on a first side of the first substrate, a first electrode layer covered by a dielectric layer;

providing the spacer structure forming the plurality of cells on the first side of the dielectric layer, wherein an area occupied by each cell includes a portion of the first electrode layer;

providing a second electrode spaced apart from the first electrode layer at least by the dielectric layer, and removing, in the area corresponding to each cell, at least one portion of the dielectric layer.

14. The method according to claim 13, wherein the step of removing at least one portion of the dielectric layer comprises:

removing, in a substantially center portion of the area corresponding to each cell, the portion of the dielectric layer.

15. The method according to claim 13, wherein the step of removing at least one portion of the dielectric layer comprises:

removing, in the area corresponding to each cell, a plurality of portions of the dielectric layer.

* * * * *